(12) United States Patent
Morimoto

(10) Patent No.: US 10,063,420 B2
(45) Date of Patent: Aug. 28, 2018

(54) NETWORK CONTROL APPARATUS, NETWORK SYSTEM, NETWORK CONTROL METHOD, AND PROGRAM

(71) Applicant: NEC Corporation, Minato-ku, Tokyo (JP)

(72) Inventor: Masaharu Morimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 143 days.

(21) Appl. No.: 15/038,788

(22) PCT Filed: Nov. 25, 2014

(86) PCT No.: PCT/JP2014/081081
§ 371 (c)(1),
(2) Date: May 24, 2016

(87) PCT Pub. No.: WO2015/080092
PCT Pub. Date: Jun. 4, 2015

(65) Prior Publication Data
US 2016/0373305 A1    Dec. 22, 2016

(30) Foreign Application Priority Data

Nov. 26, 2013  (JP) .................................. 2013-243973

(51) Int. Cl.
*H04L 12/24* (2006.01)
*H04L 12/26* (2006.01)
*H04L 12/721* (2013.01)

(52) U.S. Cl.
CPC ........ *H04L 41/0893* (2013.01); *H04L 41/042* (2013.01); *H04L 41/12* (2013.01);
(Continued)

(58) Field of Classification Search
CPC ... H04L 41/0893; H04L 41/12; H04L 43/026; H04L 45/38; H04L 45/745; H04L 45/74;
(Continued)

(56) References Cited

U.S. PATENT DOCUMENTS 8,693,344 B1 * 4/2014 Adams ................ H04L 41/0893
370/241
2006/0056384 A1 * 3/2006 Ishii ...................... H04L 43/026
370/351
(Continued)

FOREIGN PATENT DOCUMENTS

| EP | 2547047 A1 | 1/2013 |
| JP | 2012-175394 A | 9/2012 |
| WO | 2012/096131 A1 | 7/2012 |

OTHER PUBLICATIONS

Martin Casado, "Fabric: A Retrospective on Evolving SDN", HotSDN, 12 proceedings of the first workshop on Hot topics in software defined networks, Aug. 13, 2012, pp. 85 to 89 English Abstract.
(Continued)

*Primary Examiner* — Kwang B Yao
*Assistant Examiner* — Ricardo Castaneyra

(57) ABSTRACT

A control apparatus comprises: a network management unit that holds topology information and flow information; a network division unit that divides a plurality of switches into a core switch(es) and edge switches; a core network management unit that holds topology information about a core network including the core switch(es); an edge network management unit that holds topology information about an edge network including the edge switches; a core control logic that generates flow information based on the topology information about the core network and stores the flow information in the core network management unit; and an edge control logic that generates flow information based on
(Continued)

the topology information about the edge network and stores the flow information in the edge network management unit. When the flow information about the core network or the edge network is generated, the flow information held in the network management unit is updated.

16 Claims, 24 Drawing Sheets

(52) U.S. Cl.
CPC ............ *H04L 43/026* (2013.01); *H04L 45/38* (2013.01); *Y02B 60/33* (2013.01); *Y02D 50/30* (2018.01)

(58) Field of Classification Search
CPC ...... Y02B 60/33; H04W 24/08; H04W 24/00; H04W 16/18; H04W 28/16
See application file for complete search history.

(56) References Cited

U.S. PATENT DOCUMENTS

| | | | | |
|---|---|---|---|---|
| 2013/0279371 | A1* | 10/2013 | Takashima | .............. H04L 45/38 370/254 |
| 2014/0133354 | A1* | 5/2014 | Scharf | ..................... H04L 45/42 370/254 |

OTHER PUBLICATIONS

International Search Report for PCT Application No. PCT/JP2014/081081, dated Jan. 13, 2015.
English translation of Written opinion for PCT Application No. PCT/JP2014/081081.

* cited by examiner

FIG. 4

NETWORK MANAGEMENT UNIT 31

| FLOW ID | Match | Path | Actions |
|---|---|---|---|

| LINK ID | NODE ID | PORT ID | NODE ID | PORT ID |
|---|---|---|---|---|
| 61 | 101 | 1 | 102 | 1 |
| 62 | 102 | 2 | 103 | 1 |

| NODE ID | PORT ID |
|---|---|
| 101 | 1 |
| 101 | 2 |
| 102 | 1 |
| 102 | 2 |
| 103 | 1 |
| 103 | 2 |

FIG. 5

| NODE ID | PORT ID |
|---|---|
| 101 | 1 |
| 101 | 2 |
| 103 | 1 |
| 103 | 2 |

EDGE NETWORK MANAGEMENT UNIT 32

| LINK ID | NODE ID | PORT ID | NODE ID | PORT ID |
|---|---|---|---|---|

| FLOW ID | Match | Path | Actions |
|---|---|---|---|

FIG. 6

CORE NETWORK MANAGEMENT UNIT 33

| FLOW ID | Match | Path | Actions |
|---|---|---|---|

| LINK ID | NODE ID | PORT ID | NODE ID | PORT ID |
|---|---|---|---|---|

| NODE ID | PORT ID |
|---|---|
| 102 | 1 |
| 102 | 2 |

FIG. 7

BOUNDARY LINK INFORMATION TABLE 51

| LINK ID | NODE ID | PORT ID | NODE ID | PORT ID |
|---|---|---|---|---|
| 61 | 101 | 1 | 102 | 1 |
| 62 | 102 | 2 | 103 | 1 |

FIG. 8

NETWORK MANAGEMENT UNIT 31

| NODE ID | PORT ID |
|---|---|
| 101 | 1 |
| 101 | 2 |
| 102 | 1 |
| 102 | 2 |
| 103 | 1 |
| 103 | 2 |

| LINK ID | NODE ID | PORT ID | NODE ID | PORT ID |
|---|---|---|---|---|

| FLOW ID | Match | Path | Actions |
|---|---|---|---|
| flow1 | In_node = 102, In_port = 1, label = L3 | | Out_port = 102, Out_port = 2, push_label = L1 |
| flow2 | In_node = 102, In_port = 2, label = L1 | | Out_port = 102, Out_port = 1, pop_label |
| flow31 | In_node = 101, In_port = 2, label = L4 | | Out_port = 101, Out_port = 1, push_label = L1 |
| flow32 | In_node = 103, In_port = 1, label = L1 | | Out_port = 103, Out_port = 2, pop_label |
| flow41 | In_node = 103, In_port = 2, label = L3 | | Out_port = 103, Out_port = 1, push_label = L1 |
| flow42 | In_node = 101, In_port = 1, label = L1 | | Out_port = 101, Out_port = 2, pop_label |

FIG. 9

EDGE NETWORK MANAGEMENT UNIT 32

| NODE ID | PORT ID |
|---------|---------|
| 101 | 1 |
| 101 | 2 |
| 103 | 1 |
| 103 | 2 |

| LINK ID | NODE ID | PORT ID | NODE ID | PORT ID |
|---------|---------|---------|---------|---------|
| link1 | 101 | 1 | 103 | 1 |

| FLOW ID | Match | Path | Actions |
|---------|-------|------|---------|
| flow3 | In_node = 101, In_port = 2, label = L4 | link1 | Out_port = 103, Out_port = 2 |
| flow4 | In_node = 103, In_port = 2, label = L3 | link1 | Out_port = 101, Out_port = 2 |

FIG. 10

CORE NETWORK MANAGEMENT UNIT 33

| FLOW ID | Match | Path | Actions |
|---|---|---|---|
| flow1 | In_node = 102, In_port = 1, label = L1 | | Out_node = 102, Out_port = 2 |
| flow2 | In_node = 102, In_port = 2, label = L1 | | Out_node = 102, Out_port = 1 |

| LINK ID | NODE ID | PORT ID | NODE ID | PORT ID |
|---|---|---|---|---|

| NODE ID | PORT ID |
|---|---|
| 102 | 1 |
| 102 | 2 |

FIG. 13

NETWORK MANAGEMENT UNIT 531

| NODE ID | PORT ID | NODE ID | PORT ID |
|---|---|---|---|
| 401 | 1 | 405 | 1 |
| 401 | 2 | 405 | 2 |
| 402 | 1 | 406 | 1 |
| 402 | 2 | 406 | 2 |
| 403 | 1 | 407 | 1 |
| 403 | 2 | 407 | 2 |
| 403 | 3 | 408 | 1 |
| 403 | 4 | 408 | 2 |
| 403 | 5 | | |
| 403 | 6 | | |
| 404 | 1 | | |
| 404 | 2 | | |
| 404 | 3 | | |
| 404 | 4 | | |
| 404 | 5 | | |
| 404 | 6 | | |

| LINK ID | NODE ID | PORT ID | NODE ID | PORT ID |
|---|---|---|---|---|
| 501 | 401 | 1 | 403 | 1 |
| 502 | 401 | 2 | 404 | 1 |
| 503 | 402 | 1 | 403 | 2 |
| 504 | 402 | 2 | 404 | 2 |
| 505 | 403 | 3 | 405 | 1 |
| 506 | 403 | 4 | 406 | 1 |
| 507 | 403 | 5 | 407 | 1 |
| 508 | 403 | 6 | 408 | 1 |
| 509 | 404 | 3 | 405 | 2 |
| 510 | 404 | 4 | 406 | 2 |
| 511 | 404 | 5 | 407 | 2 |
| 512 | 404 | 6 | 408 | 2 |

| FLOW ID | Match | Path | Actions |
|---|---|---|---|

FIG. 14

ToR NETWORK MANAGEMENT UNIT 532

| NODE ID | PORT ID |
|---------|---------|
| 405 | 1 |
| 405 | 2 |
| 406 | 1 |
| 406 | 2 |
| 407 | 1 |
| 407 | 2 |
| 408 | 1 |
| 408 | 2 |

| LINK ID | NODE ID | PORT ID | NODE ID | PORT ID |
|---------|---------|---------|---------|---------|
| | | | | |

| FLOW ID | Match | Path | Actions |
|---------|-------|------|---------|
| | | | |

FIG. 15

NETWORK MANAGEMENT UNIT 533

| FLOW ID | Match | Path | Actions |
|---|---|---|---|

| LINK ID | NODE ID | PORT ID | NODE ID | PORT ID |
|---|---|---|---|---|
| 501 | 401 | 1 | 403 | 1 |
| 502 | 401 | 2 | 404 | 1 |
| 503 | 402 | 1 | 403 | 2 |
| 504 | 402 | 2 | 404 | 2 |

| NODE ID | PORT ID |
|---|---|
| 401 | 1 |
| 401 | 2 |
| 402 | 1 |
| 402 | 2 |
| 403 | 1 |
| 403 | 2 |
| 403 | 3 |
| 403 | 4 |
| 403 | 5 |
| 403 | 6 |
| 404 | 1 |
| 404 | 2 |
| 404 | 3 |
| 404 | 4 |
| 404 | 5 |
| 404 | 6 |

FIG. 16

BOUNDARY LINK INFORMATION TABLE 551

| LINK ID | NODE ID | PORT ID | NODE ID | PORT ID |
|---------|---------|---------|---------|---------|
| 505 | 403 | 3 | 405 | 1 |
| 506 | 403 | 4 | 406 | 1 |
| 507 | 403 | 5 | 407 | 1 |
| 508 | 403 | 6 | 408 | 1 |
| 509 | 404 | 3 | 405 | 2 |
| 510 | 404 | 4 | 406 | 2 |
| 511 | 404 | 5 | 407 | 2 |
| 512 | 404 | 6 | 408 | 2 |

FIG. 17

AGGREGATION NETWORK MANAGEMENT UNIT 534

| NODE ID | PORT ID |
|---|---|
| 403 | 1 |
| 403 | 2 |
| 403 | 3 |
| 403 | 4 |
| 403 | 5 |
| 403 | 6 |
| 404 | 1 |
| 404 | 2 |
| 404 | 3 |
| 404 | 4 |
| 404 | 5 |
| 404 | 6 |

| LINK ID | NODE ID | PORT ID | NODE ID | PORT ID |
|---|---|---|---|---|

| FLOW ID | Match | Path | Actions |
|---|---|---|---|

FIG. 18

CORE NETWORK MANAGEMENT UNIT 535

| LINK ID | NODE ID | PORT ID | NODE ID | PORT ID |
|---|---|---|---|---|

| FLOW ID | Match | Path | Actions |
|---|---|---|---|

| NODE ID | PORT ID |
|---|---|
| 401 | 1 |
| 401 | 2 |
| 402 | 1 |
| 402 | 2 |

FIG. 19

BOUNDARY LINK INFORMATION TABLE 552

| LINK ID | NODE ID | PORT ID | NODE ID | PORT ID |
|---|---|---|---|---|
| 501 | 401 | 1 | 403 | 1 |
| 502 | 401 | 2 | 404 | 1 |
| 503 | 402 | 1 | 403 | 2 |
| 504 | 402 | 2 | 404 | 2 |

FIG. 20

NETWORK MANAGEMENT UNIT 531

| NODE ID | PORT ID |
|---|---|
| 401 | 1 |
| 401 | 2 |
| 402 | 1 |
| 402 | 2 |
| 403 | 1 |
| 403 | 2 |
| 403 | 3 |
| 403 | 4 |
| 403 | 5 |
| 403 | 6 |
| 404 | 1 |
| 404 | 2 |
| 404 | 3 |
| 404 | 4 |
| 404 | 5 |
| 404 | 6 |
| 405 | 1 |
| 405 | 2 |
| 406 | 1 |
| 406 | 2 |
| 407 | 1 |
| 407 | 2 |
| 408 | 1 |
| 408 | 2 |

| LINK ID | NODE ID | PORT ID | NODE ID | PORT ID |
|---|---|---|---|---|
| 501 | 401 | 1 | 403 | 1 |
| 502 | 401 | 2 | 404 | 1 |
| 503 | 402 | 1 | 403 | 2 |
| 504 | 402 | 2 | 404 | 2 |
| 505 | 403 | 3 | 405 | 1 |
| 506 | 403 | 4 | 406 | 1 |
| 507 | 403 | 5 | 407 | 1 |
| 508 | 403 | 6 | 408 | 1 |
| 509 | 404 | 3 | 405 | 2 |
| 510 | 404 | 4 | 406 | 2 |
| 511 | 404 | 5 | 407 | 2 |
| 512 | 404 | 6 | 408 | 2 |

| FLOW ID | Match | Path | Actions |
|---|---|---|---|
| flow1 | In_node = 401, In_port = 1, label = L1 | | Out_node = 401, Out_port = 2 |
| flow2 | In_node = 401, In_port = 2, label = L1 | | Out_node = 401, Out_port = 1 |
| flow31 | In_node = 403, In_port = 3, label = L4 | | Out_port = 403, Out_port = 1, push_label = L1 |
| flow32 | In_node = 404, In_port = 1, label = L1 | | Out_port = 404, Out_port = 5, pop_label |
| flow41 | In_node = 404, In_port = 5, label = L3 | | Out_port = 404, Out_port = 1, push_label = L1 |
| flow42 | In_node = 403, In_port = 1, label = L1 | | Out_port = 403, Out_port = 3, pop_label |
| flow51 | In_node = 405, In_port = 3 | | Out_node = 405, Out_port = 1, push_label = L4 |
| flow52 | In_node = 407, In_port = 2, label = L4 | | Out_node = 407, Out_port = 3, pop_label |
| flow61 | In_node = 407, In_port = 3 | | Out_node = 407, Out_port = 2, push_label = L3 |
| flow62 | In_node = 405, In_port = 1, label = L3 | | Out_node = 405, Out_port = 3, pop_label |

FIG. 21

| NODE ID | PORT ID |
|---|---|
| 405 | 1 |
| 405 | 2 |
| 406 | 1 |
| 406 | 2 |
| 407 | 1 |
| 407 | 2 |
| 408 | 1 |
| 408 | 2 |

ToR NETWORK MANAGEMENT UNIT 532

| LINK ID | NODE ID | PORT ID | NODE ID | PORT ID |
|---|---|---|---|---|
| link2 | 405 | 1 | 407 | 2 |

| FLOW ID | Match | Path | Actions |
|---|---|---|---|
| flow5 | In_node = 405, In_port = 3 | link2 | Out_node = 407, Out_port = 3 |
| flow6 | In_node = 407, In_port = 3 | link2 | Out_node = 405, Out_port = 3 |

FIG. 22

| NODE ID | PORT ID |
|---|---|
| 401 | 1 |
| 401 | 2 |
| 402 | 1 |
| 402 | 2 |
| 403 | 1 |
| 403 | 2 |
| 403 | 3 |
| 403 | 4 |
| 403 | 5 |
| 403 | 6 |
| 404 | 1 |
| 404 | 2 |
| 404 | 3 |
| 404 | 4 |
| 404 | 5 |
| 404 | 6 |

NETWORK MANAGEMENT UNIT 533

| LINK ID | NODE ID | PORT ID | NODE ID | PORT ID |
|---|---|---|---|---|
| 501 | 401 | 1 | 403 | 1 |
| 502 | 401 | 2 | 404 | 1 |
| 503 | 402 | 1 | 403 | 2 |
| 504 | 402 | 2 | 404 | 2 |

| FLOW ID | Match | Path | Actions |
|---|---|---|---|
| flow1 | In_node = 401, In_port = 1, label = L1 | | Out_node = 401, Out_port = 2 |
| flow2 | In_node = 401, In_port = 2, label = L1 | | Out_node = 401, Out_port = 1 |
| flow31 | In_node = 403, In_port = 3, label = L4 | | Out_port = 403, Out_port = 1, push_label = L1 |
| flow32 | In_node = 404, In_port = 1, label = L1 | | Out_port = 404, Out_port = 5, pop_label |
| flow41 | In_node = 404, In_port = 5, label = L3 | | Out_port = 404, Out_port = 1, push_label = L1 |
| flow42 | In_node = 403, In_port = 1, label = L1 | | Out_port = 403, Out_port = 3, pop_label |

FIG. 23

AGGREGATION NETWORK MANAGEMENT UNIT 534

| NODE ID | PORT ID |
|---|---|
| 403 | 1 |
| 403 | 2 |
| 403 | 3 |
| 403 | 4 |
| 403 | 5 |
| 403 | 6 |
| 404 | 1 |
| 404 | 2 |
| 404 | 3 |
| 404 | 4 |
| 404 | 5 |
| 404 | 6 |

| LINK ID | NODE ID | PORT ID | NODE ID | PORT ID |
|---|---|---|---|---|
| link1 | 403 | 1 | 404 | 1 |

| FLOW ID | Match | Path | Actions |
|---|---|---|---|
| flow3 | In_node = 403, In_port = 3, label = L4 | link1 | Out_port = 404, Out_port = 5 |
| flow4 | In_node = 404, In_port = 5, label = L3 | link1 | Out_port = 403, Out_port = 3 |

FIG. 24

CORE NETWORK MANAGEMENT UNIT 535

| FLOW ID | Match | Path | Actions |
|---|---|---|---|
| flow1 | In_node = 401, In_port = 1, label = L1 | | Out_node = 401, Out_port = 2 |
| flow2 | In_node = 401, In_port = 2, label = L1 | | Out_node = 401, Out_port = 1 |

| LINK ID | NODE ID | PORT ID | NODE ID | PORT ID |
|---|---|---|---|---|
| | | | | |

| NODE ID | PORT ID |
|---|---|
| 401 | 1 |
| 401 | 2 |
| 402 | 1 |
| 402 | 2 |

NETWORK CONTROL APPARATUS, NETWORK SYSTEM, NETWORK CONTROL METHOD, AND PROGRAM

REFERENCE TO RELATED APPLICATION

The present application is a National Stage Entry of PCT/JP2014/081081 filed on Nov. 25, 2014, which is based on and claims the benefit of the priority of Japanese patent application No. 2013-243973, filed on Nov. 26, 2013, the disclosures of all of which are incorporated herein in their entirety by reference thereto. The present invention relates to a network control apparatus, a network system, a network control method, and a program. In particular, the present invention relates to a network control apparatus, a network system, a network control method, and a program for managing switches that forward traffic in a centralized manner.

FIELD

Background

PTL 1 discloses a centralized-management-type network system. This network system includes switches that forward traffic and a controller that manages and controls the switches.

The network system disclosed in PTL 1 operates as follows. The controller detects a topology of a network, which includes the switches managed by the controller, and assigns a node ID (identifier) to each of the switches. In addition, the controller registers a flow entry(ies) in a core switch(es) that serves as a relay switch(es). In such a flow entry, the controller specifies a node ID in destination information in a match condition and sets an action for outputting a matching packet(s) to a specified port. The controller also detects terminals and assigns a user ID to each of the terminals. In addition, the controller sets a flow entry(ies) in an output-side edge switch(es). In such a flow entry, the controller specifies a user ID in destination information in a match condition and sets an action for writing the destination information from the user ID back to destination information about the corresponding terminal. In addition, the controller sets a flow entry(ies) in an input-side edge switch(es). In such a flow entry, the controller writes destination information in a match condition and a destination node ID and user ID as destination information in the action. In this way, the controller registers different kinds of flow entries in the core switch(es) and the edge switch(es), respectively.

In addition, NPL 1 discloses another centralized-management-type network system. This network system includes an edge controller that manages and controls an ingress edge switch and an egress edge switch, a fabric controller that manages and controls fabric elements, a source (src) host that is connected to the ingress switch and transmits traffic, and a destination (dst) host that is connected to the egress switch and receives the traffic.

The centralized-management-type network system disclosed in NPL 1 operates as follows. The fabric controller manages and controls the fabric elements so that a traffic forwarding service is provided in a network including the fabric elements. The edge controller manages and controls the edge switches so that more sophisticated network services (security, isolation, mobility, etc.) are provided by the edge switches. Namely, when the source (src) host transmits a packet to the ingress edge switch, the edge controller attaches a destination address or path identifier used among the fabric elements to the ingress edge switch and causes the ingress edge switch to transmit the packet. In this way, the ingress edge switch is able to apply specified network services to the packet and transmit the packet to the egress edge switch, which is the destination of the packet. Next, in accordance with the destination address or path identifier used among the fabric elements, which has been attached to the ingress edge switch, the fabric controller controls forwarding of the packet until the packet reaches the destination egress edge switch. Finally, the edge controller causes the egress edge switch to remove the destination address or path identifier attached to the ingress edge switch and forward the packet to the destination (dst) host. In addition, NPL 1 discloses two kinds of methods, namely, address translation and encapsulation, regarding attaching the destination address or path identifier used among the above fabric elements.

PTL 1: International Publication No. WO2012/096131
NPL 1: Martin Casado, Teemu Koponen, Scott Shenker, and Amin Tootoonchian, "Fabric: A Retrospective on Evolving SDN," HotSDN'12, Aug. 13, 2012, Helsinki, Finland.

SUMMARY

The entire disclosure of each of the above PTL and NPL is incorporated herein by reference thereto. The following analysis has been given by the present inventor.

The method disclosed in PTL 1 has a problem in that the flow entry control logic set by the controller is complicated. This is because the above control logic needs to behave differently depending on whether the target switch whose flow entry(ies) is controlled is a core switch or an edge switch on the network topology.

The method disclosed in NPL 1 has a problem in that a procedure for dividing a network into edge and core switches cannot be performed recursively. This is because the network is divided into networks controlled by the edge controller and the fabric controller, respectively, and both of the controllers include a control logic. For example, to recursively divide the fabric elements into edge switches and fabric elements, the fabric controller needs to implement additional dividing processing.

Therefore, there is demanded a technique, with which a control logic that controls edge switches and a control logic that controls a core switch(es) can separately be implemented easily and with which a network can recursively be divided into two networks of a network including edge switches (hereinafter, referred to an "edge network") and a network including a core switch(es) (hereinafter, referred to as a "core network").

According to a first aspect of the present invention, there is provided a network control apparatus, comprising: a network management unit that holds topology information and flow information about a network including a plurality of switches; a network division unit that divides the plurality of switches into a core switch(es) and an edge switch(es) based on the topology information; a core network management unit that holds topology information and flow information about a core network including the core switch(es); an edge network management unit that holds topology information and flow information about an edge network including the edge switch(es); a core control logic that generates flow information about the core network based on the topology information about the core network and stores the flow information in the core network management unit; and an edge control logic that generates flow information about the edge network based on the topology information about the edge network and stores the flow information in the edge network management unit. When the core control logic generates the flow information about the core network or when the edge control logic generates the flow information about the edge network, the network division unit updates flow information held in the network management unit.

According to a second aspect of the present invention, there is provided a network system, comprising: a plurality of switches; and a network control apparatus that controls the plurality of switches. The network control apparatus comprises: a network management unit that holds topology information and flow information about a network including a plurality of switches; a network division unit that divides the plurality of switches into a core switch(es) and an edge switch(es) based on the topology information; a core network management unit that holds topology information and flow information about a core network including the core switch(es); an edge network management unit that holds topology information and flow information about an edge network including the edge switch(es); a core control logic that generates flow information about the core network based on the topology information about the core network and stores the flow information in the core network management unit; and an edge control logic that generates flow information about the edge network based on the topology information about the edge network and stores the flow information in the edge network management unit. When the core control logic generates the flow information about the core networkor when the edge control logic generates the flow information about the edge network, the network division unit updates flow information held in the network management unit.

According to a third aspect of the present invention, there is provided a network control method, comprising: by a computer, storing topology information and flow information about a network including a plurality of switches in a network management unit; dividing the plurality of switches into a core switch(es) and an edge switch(es) based on the topology information; storing topology information and flow information about a core network including the core switch(es) in a core network management unit; storing topology information and flow information about an edge network including the edge switch(es) in an edge network management unit; generating flow information about the core network based on the topology information about the core network and storing the flow information in the core network management unit; generating flow information about the edge network based on the topology information about the edge network and storing the flow information in the edge network management unit; and updating, when the flow information about the core network is generated or when the flow information about the edge network is generated, flow information held in the network management unit.

According to a fourth aspect of the present invention, there is provided a program, causing a computer to execute: storing topology information and flow information about a network including a plurality of switches in a network management unit; dividing the plurality of switches into a core switch(es) and an edge switch(es) based on the topology information; storing topology information and flow information about a core network including the core switch(es) in a core network management unit; storing topology information and flow information about an edge network including the edge switch(es) in an edge network management unit; generating flow information about the core network based on the topology information about the core network and storing the flow information in the core network management unit; generating flow information about the edge network based on the topology information about the edge network and storing the flow information in the edge network management unit; and updating, when the flow information about the core network is generated or when the flow information about the edge network is generated, flow information held in the network management unit. The program can be recorded in a non-transitory computer-readable storage medium and provided as a program product.

The present invention provides the following advantage, but not restricted thereto. With the network control apparatus, the network system, the network control method, and the program according to the present invention, a control logic that controls edge switches and a control logic that controls a core switch(es) can separately be implemented easily, and a network can recursively be divided into two networks of an edge network and a core network.

BRIEF DESCRIPTION OF DRAWINGS

FIG. 4 illustrates an example of network information registered in a network management unit according to the first exemplary embodiment.

FIG. 5 illustrates an example of network information registered in an edge network management unit according to the first exemplary embodiment.

FIG. 6 illustrates an example of network information registered in a core network management unit according to the first exemplary embodiment.

FIG. 7 illustrates examples of boundary links registered in a boundary link information table according to the first exemplary embodiment.

FIG. 8 illustrates an example of network information registered in the network management unit according to the first exemplary embodiment.

FIG. 9 illustrates an example of network information registered in the edge network management unit according to the first exemplary embodiment.

FIG. 10 illustrates an example of network information registered in the core network management unit according to the first exemplary embodiment.

FIG. 13 illustrates an example of network information registered in a network management unit 531 according to the second exemplary embodiment.

FIG. 14 illustrates an example of network information registered in a ToR network management unit according to the second exemplary embodiment.

FIG. 15 illustrates an example of network information registered in a network management unit 533 according to the second exemplary embodiment.

FIG. 16 illustrates examples of boundary links registered in a boundary link information table 551 according to the second exemplary embodiment.

FIG. 17 illustrates an example of network information registered in an aggregation network management unit according to the second exemplary embodiment.

FIG. 18 illustrates an example of network information registered in a core network management unit according to the second exemplary embodiment.

FIG. 19 illustrates examples of boundary links registered in a boundary link information table 552 according to the second exemplary embodiment.

FIG. 20 illustrates an example of network information registered in the network management unit 531 according to the second exemplary embodiment.

FIG. 21 illustrates an example of network information registered in the ToR network management unit according to the second exemplary embodiment.

FIG. 22 illustrates an example of network information registered in the network management unit 533 according to the second exemplary embodiment.

FIG. 23 illustrates an example of network information registered in the aggregation network management unit according to the second exemplary embodiment.

FIG. 24 illustrates an example of network information registered in the core network management unit according to the second exemplary embodiment.

PREFERRED MODES

Figure 1:
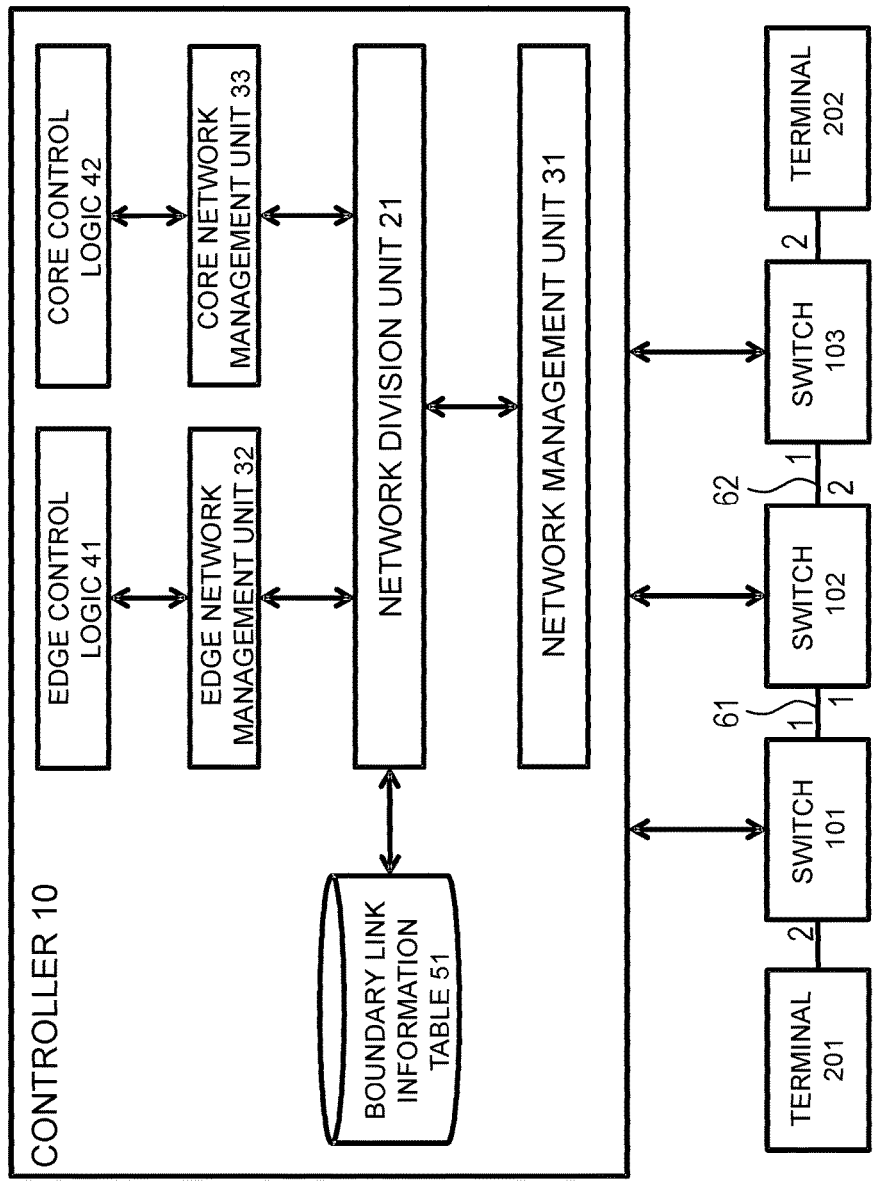
FIG. 1 is a block diagram illustrating an example of a configuration of a network system according to a first exemplary embodiment.

In the present disclosure, there are various possible modes, which include the following, but not restricted thereto. First, an outline of the present invention will be described. In the following outline, reference characters are merely used as examples to facilitate understanding of the present invention. Namely, the reference characters are not intended to limit the present invention to the illustrated modes.

As illustrated in FIG. 1, a network system includes a network control apparatus (a controller 10). Among the communication flows in a network, the network control apparatus controls flows via an edge network separately from flows via a core network. The network control apparatus includes a network management unit 31, an edge control logic 41, an edge network management unit 32, a core control logic 42, a core network management unit 33, a network division unit 21, and a boundary link information table 51.

The edge network management unit 32 holds network information including topology information and flow information about an edge network that includes edge switches (for example, switches 101 and 103 in FIG. 1) controlled by the edge control logic 41. The core network management unit 33 holds network information including topology information and flow information about the core network that includes a core switch(es) (for example, a switch 102 in FIG. 1) controlled by the core control logic 42. The network division unit 21 divides network information registered in the network management unit 31 into network information about the edge network and network information about the core network and registers the divided network information in the edge network management unit 32 and the core network management unit 33, respectively. In addition, if the information in the edge network management unit 32 or the core network management unit 33 is updated, the network division unit 21 updates the information in the source network management unit 31.

The network control apparatus (the controller 10) controls the switches 101 to 103 based on the network information in the source network management unit 31 updated by the network division unit 21.

Figure 2:
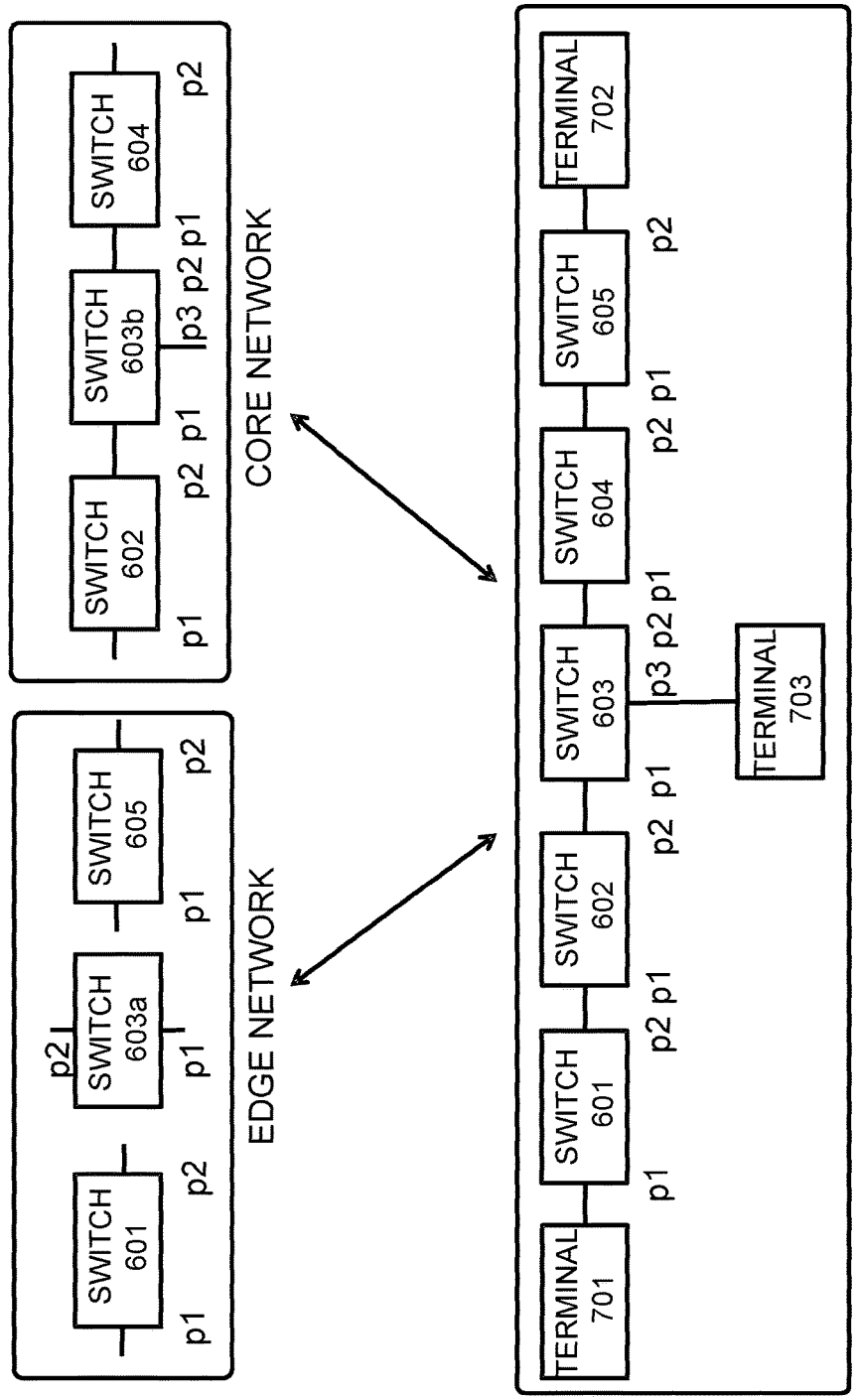
FIG. 2 illustrates an example of a configuration of a network system including an edge and core switch according to the first exemplary embodiment.

In addition, among the switches registered in the network management unit 31, if a switch has at least two ports connected to other switches via links, respectively, and if the other port(s) of the switch does not have a link(s), the network division unit 21 may determine this switch to be a core switch (for example, the switch 102 in FIG. 1 and switches 602 and 604 in FIG. 2). If a switch has no or one port connected to another switch via a link and has a port(s) having a link(s), the network division unit 21 may determine this switch to be an edge switch (for example, the switches 101 and 103 in FIG. 1 and switches 601 and 605 in FIG. 2). If a switch has at least two ports connected to other switches via links, respectively, and has a port(s) having a link, the network division unit 21 may determine this switch to be an edge and core switch (for example, a switch 603 in FIG. 2). In addition, as a result of the determination, the network division unit 21 registers the edge switches in the edge network management unit 32 as network information about the edge network and registers the core switch(es) in the core network management unit 33 as network information about the core network. In addition, when the division is performed, the network division unit 21 registers information about the links at the boundary between the edge switches and the core switch(es) (for example, information about links 61 and 62 in FIG. 1) in the boundary link information table 51 (see FIG. 7).

In addition, as illustrated in FIG. 2, the network division unit 21 divides the edge and core switch (the switch 603 in FIG. 2) into two logical switches, namely, a logical edge switch (a switch 603a in FIG. 2) and a logical core switch (a switch 603b in FIG. 2), and registers the logical edge switch and the logical core switch in the edge network management unit 32 and the core network management unit 33, respectively. In addition, the network division unit 21 generates a logical link between the logical edge switch and the logical core switch and registers the generated logical link in the boundary link information table 51.

In addition, when flow information is registered in the core network management unit 33, the network division unit 21 registers the flow information in the source network management unit 31. Next, the network division unit 21 acquires an input port from a corresponding match condition in the flow information, an action, and two ports (a port 1 of the switch 101 and a port 1 of the switch 103 in FIG. 1) that serve as end points of the edge network held in the edge network management unit 32 from the boundary link information table. In addition, the network division unit 21 registers the acquired ports in the edge network management unit 32 as a link in the edge network (for example, a link 1 in FIG. 9).

In addition, when flow information is registered in the edge network management unit 32, among the links through which a communication flow corresponding to the flow information passes, if the communication flow passes through the link registered in the boundary link information table 51, the network division unit 21 divides the communication flow at both ends of the link and registers the divided communication flows in the source network management unit 31. In addition, the network division unit 21 applies the network information updated by the edge network management unit 32 and the core network management unit 33 to the network management unit 31.

According to the network system having the above configuration, the control logics that control the edge network and the core network can be more separated (or loosely coupled). This is because information registered in the edge network management unit 32 and the core network management unit 33 by the network division unit 21 only includes information about the edge switches and information about the core switch(es), respectively, and information about the boundary between the core switch(es) and the edge switches is managed by the boundary link information table 51. Thus, a control logic that controls the edge network can be established by using the information held in the edge network management unit 32 and the boundary link information table 51. In addition, a control logic that controls the core network can be established by using the information held in the core network management unit 33 and the boundary link information table 51.

In addition, according to the network system having the above configuration, the network division unit 21 is recursively applicable. This is because the network division unit 21 is applicable to the network management unit 31 and the output from the network division unit 21 is used to update the network information in the network management unit 31.

As described above, in the network system according to the above exemplary embodiment, by applying the network division module, it is possible to prevent the flow entry control logic set by the network control apparatus from becoming complicated. In addition, this network division module can recursively be applied.

Exemplary Embodiment 1

Next, a network system according to a first exemplary embodiment will be described in detail with reference to the drawings.
(Configuration)

As illustrated in FIG. 1, the network system according to the present exemplary embodiment includes the controller 10 that includes a computer (a central processing unit, a processor, a data processing unit) controlled by a program, the switches 101 to 103 controlled by the controller 10, and terminals 201 and 202.

The controller 10 includes the network management unit 31, the network division unit 21, the edge network management unit 32, the core network management unit 33, the edge control logic 41, the core control logic 42, and the boundary link information table 51.

The network management unit 31 manages the topology of and flows in the network that includes the switches 101 to 103 or the statuses of the topology and flows (hereinafter, referred to as "network information"). The network division unit 21 divides the network information managed by the network management unit 31 into network information about an edge network and network information about a core network. In addition, the network division unit 21 stores the network information about the edge network in the edge network management unit 32 and the network information about the core network in the core network management unit 33. In addition, the network division unit 21 stores information about links in the boundary link information table 51, the links at the boundary that has occurred when the network information is divided and stored in the edge network management unit 32 and the core network management unit 33.

The topology information includes information about nodes, ports, and links and attribute information such as status information associated with these elements. The flow information includes a list of match conditions that are matched against a communication flow from a port of a node to a port of another node, information about a corresponding link(s) through which the communication flow passes, and a corresponding action performed on a packet by a node.

The above units basically operate as follows.

The controller 10 detects the switches 101 to 103 and connection links among these switches and establishes topology information from the detected information. In addition, the controller 10 establishes flow information from information included in a flow entry(ies) and registers all the established status information in the network management unit 31 as network information. In addition, based on the information updated in the network management unit 31, the controller 10 controls the switches 101 to 103.

The network division unit 21 determines whether an individual switch belongs to the edge network or the core network as follows.

Namely, among the switches registered in the network management unit 31, if a switch has at least two ports connected to other switches via links, respectively, and if the other port(s) of the switch does not have a link(s), the network division unit 21 determines this switch to be a core switch (the switch 102 in FIG. 1). In addition, if a switch has no or one port connected to another switch via a link and has a port(s) having a link(s), the network division unit 21 determines this switch to be an edge switch (the switches 101 and 103 in FIG. 1). In addition, if a switch has at least two ports connected to other switches via links, respectively, and has a port(s) having a link, the network division unit 21 determines this switch to be an edge and core switch (for example, the switch 603 in FIG. 2).

As a result of the determination, the network division unit 21 registers the edge switches 101 and 103 in the edge network management unit 32 as network information about the edge network and registers the core switch 102 in the core network management unit 33 as network information about the core network. In addition, when the division is performed, the network division unit 21 registers information about the links at the boundary between the edge switches and the core switch in the boundary link information table 51 (information about the links 61 and 62).

In addition, as illustrated in FIG. 2, the network division unit 21 divides the edge and core switch into two logical switches, namely, the logical edge switch 603a and the logical core switch 603b, and registers these logical switches in the edge network management unit 32 and the core network management unit 33, respectively. In addition, the network division unit 21 generates a logical link between the logical edge switch 603a and the logical core switch 603b and registers information about the generated logical link in the boundary link information table 51.

When flow information is registered in the core network management unit 33, the network division unit 21 registers the registered flow information in the source network management unit 31. Next, the network division unit 21 acquires an input port included in a match condition in the registered flow information, an output port included in an action, and two ports that serve as end points of the edge network managed by the edge network management unit 32 from the boundary link information table 51. In addition, the network division unit 21 registers the acquired two ports in the edge network management unit 32 as a link in the edge network.

When flow information is registered in the edge network management unit 32, if a communication flow corresponding to the registered flow information passes through the link registered in the boundary link information table 51, the network division unit 21 divides the communication flow at both ends of the link and registers flow information corresponding to each of the divided communication flows in the source network management unit 31.

In addition, the network division unit 21 applies the network information updated by the edge network management unit 32 and the core network management unit 33 to the network management unit 31.

Among the network information registered in the network management unit 31, the network division unit 21 having the above functions registers the information about the edge network in the edge network management unit 32 and the information about the core network in the core network management unit 33 and registers the corresponding boundary link information in the boundary link information table 51.

The core control logic 42 generates flow information based on the topology information registered in the core network management unit 33 and the information in the boundary link information table 51 and registers the generated flow information in the core network management unit 33.

The edge control logic 41 generates flow information based on the topology information registered in the edge network management unit 32 and the information in the boundary link information table 51 and registers the generated flow information in the edge network management unit 32.

The above units interact with one another so that all the flow information is eventually accumulated in the network management unit 31. As a result, the controller 10 can actually control the switches 101 to 103. In addition, the edge control logic 41 can realize a control logic only with the network information managed by the edge network management unit 32, and the core control logic 42 can realize a control logic only with the network information managed by the core network management unit 33. In addition, since the network division unit 21 can be applied to the network management unit 31 and can separately register network information in different network management units (the edge network management unit 32 or the core network management unit 33), the network division unit 21 can recursively divide a network into the edge network and the core network.

(Operation)

Next, the operation performed by the controller 10 in the network system according to the present exemplary embodiment will be described in detail with reference to the configuration diagram in FIG. 1 and the flowchart in FIG. 3.

First, the controller 10 detects the switches 101 to 103 and connection links among these switches and establishes topology information from the detected information. In addition, the controller 10 establishes flow information from information included in a flow entry(ies) managed by each of the switches and registers all the established status information in the network management unit 31 as network information (step S1).

Next, the network division unit 21 divides the network information registered in the network management unit 31 into information about the edge network and information about the core network and registers the divided network information in the edge network management unit 32 and the core network management unit 33, respectively. In addition, the network division unit 21 registers information about the links at the boundary between the core network and the edge network (the link between the switches 101 and 102 and the link between the switches 102 and 103) in the boundary link information table 51 (step S2).

Next, the core control logic 42 generates flow information based on the topology information registered in the core network management unit 33 and registers the generated flow information in the core network management unit 33 (step S3).

Next, the network division unit 21 detects events registered in the flow information in the core network management unit 33 and registers the flow information in the network management unit 31. In addition, the network division unit 21 acquires an input port from a match condition in the flow information, an output port from an action, and two ports that serve as end points of the edge network managed by the edge network management unit 32 from the boundary link information table 51. In addition, the network division unit 21 registers a link between the acquired two ports in the edge network management unit 32 (step S4).

Next, the edge control logic 41 generates flow information based on the topology information registered in the edge network management unit 32 and the information in the boundary link information table 51 and registers the generated flow information in the edge network management unit 32 (step S5).

Next, the network division unit 21 detects events registered in the flow information in the edge network management unit 32. If a communication flow corresponding to the flow information passes through the link registered in the boundary link information table 51, the network division unit 21 divides the communication flow at both ends of the link and registers flow information corresponding to the respective divided communication flows in the source network management unit 31 (step S6).

Next, information held in the network management unit 31, the edge network management unit 32, the core network management unit 33, and the boundary link information table 51 in the network system according to the present exemplary embodiment will be described in detail by using the network illustrated in FIG. 1 as an example.

Figure 3:
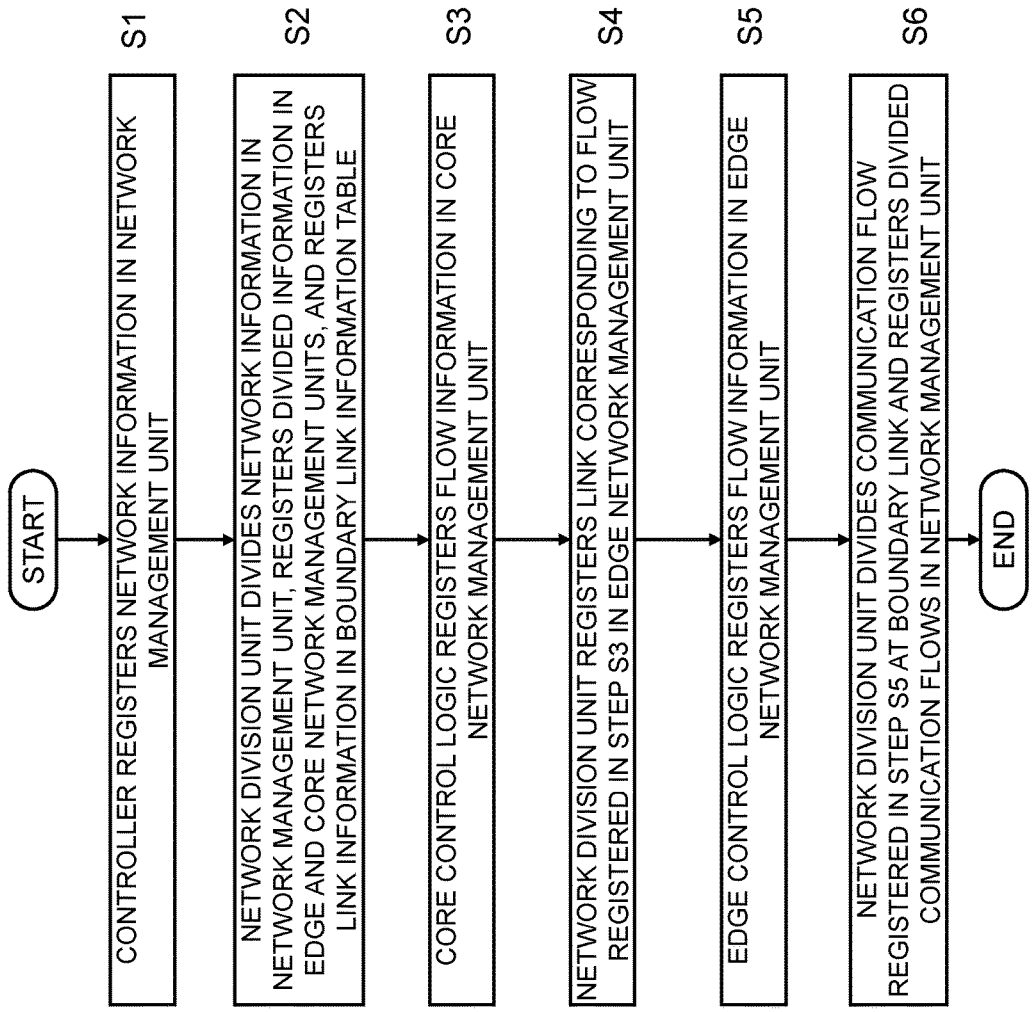
FIG. 3 is a flowchart illustrating an example of an operation of the network system according to the first exemplary embodiment.

FIG. 4 illustrates network information that the controller 10 registers in the network management unit 31 in step S1 in FIG. 3. The network information includes a list of node and port information, a list of link information, and a list of flow information.

FIG. 5 illustrates network information managed by the edge network management unit 32, namely, network information about the edge network including the switches that the network division unit 21 has determined to be edge switches (the switches 101 and 103 in FIG. 1) based on the network information registered in the network management unit 31 in step S2 in FIG. 3.

FIG. 6 illustrates network information managed by the core network management unit 33, namely, network information about the core network including the switch that the network division unit 21 has determined to be a core switch (the switch 102 in FIG. 1) based on the network information registered in the network management unit 31 in step S2 in FIG. 3.

FIG. 7 illustrates boundary link information managed by the boundary link information table 51. Namely, the link information in FIG. 7 indicates information about links (the links 61 and 62 in FIG. 1) that serve as the boundary links between the core switch and the edge switches when the network division unit 21 divides the switches included in the network registered in the network management unit 31 into the core switch and the edge switches in step S2 in FIG. 3.

In the network system according to the present exemplary embodiment, when communication flows in the core network and the edge network are registered, network information corresponding to the communication flows is stored in the network management unit 31, the edge network management unit 32, and the core network management unit 33. This storage operation will hereinafter be described.

FIGS. 8 to 10 illustrate exemplary statuses obtained after the edge control logic 41 and the core control logic 42 have registered respective flow information.

As illustrated in FIG. 10, the core control logic 42 registers flows 1 and 2, which pass through the core switch 102, in the core network management unit 33 (step S3 in FIG. 3). The core control logic 42 registers a flow(s) for forwarding data to which a label indicating a destination node ID is attached (in this example, it is assumed that the switch 102 corresponds to a label L1).

As illustrated in FIG. 9, when the flows 1 and 2 are registered in the core network management unit 33 (FIG. 10), the network division unit 21 registers link information link 1, which corresponds to the added flows, in the edge network management unit 32 (step S4 in FIG. 3).

In addition, as illustrated in FIG. 9, the edge control logic 41 registers flows 3 and 4 in the edge network management unit 32 (step S5 in FIG. 3). The registered flows pass through the link 1 registered in step S4. The edge control logic 41 registers a flow(s) for forwarding data to which a label indicating a destination node ID is attached (in this example, it is assumed that the switches 101 and 103 correspond to labels L3 and L4, respectively).

As illustrated in FIG. 8, the network division unit 21 converts the flow information (FIGS. 9 and 10) registered in steps S3 and S5 and registers the converted flow information in the source network management unit 31 (step S6 in FIG. 3). Both of the flows 3 and 4 registered in the edge network management unit 32 pass through the boundary links 61 and 62 registered in the boundary link information table (FIG. 7). Therefore, the network division unit 21 divides the flow 3 into flows 31 and 32, divides the flow 4 into flows 41 and 42, and registers the divided flows in the network management unit 31. More specifically, the network division unit 21 adds an action for attaching a label, which is requested by the flows 1 and 2 registered in the core network management unit 33, to each of the flows 31 and 41. In addition, the network division unit 21 adds an action for deleting the attached label to each of the flows 32 and 42.

Next, advantageous effects of the network system according to the present exemplary embodiment will be described. In the present exemplary embodiment, the network division unit 21 can be applied to the network management unit 31. In addition, the network division unit 21 divides the network information in the network management unit 31 and generates network information to be separately stored in the edge network management unit 32 and the core network management unit 33. Thus, the edge control logic 41 can be implemented by using the network information managed by the edge network management unit 32 and the boundary link information table 51. In addition, the core control logic 42 can be implemented by using the network information managed by the core network management unit 33 and the boundary link information table 51. Namely, according to the present exemplary embodiment, it is easy to separately implement a control logic that controls edge switches and a control logic that controls a core switch(es). In addition, according to the present exemplary embodiment, the network division unit 21 can recursively be applied to the network management unit 31, and the network can recursively be divided into two networks of the edge network and the core network.

Exemplary Embodiment 2

Next, a network system according to a second exemplary embodiment will be described in detail with reference to the drawings.

In the network system according to the present exemplary embodiment, a network including three kinds of OpenFlow switches, which are Top of Rack (ToR) switches, aggregation switches, and core switches, is divided into a network including the ToR switches, a network including the aggregation switches, and a network including the core switches. However, the present invention is not limited to the network configuration according to the present exemplary embodiment.

Figure 11:
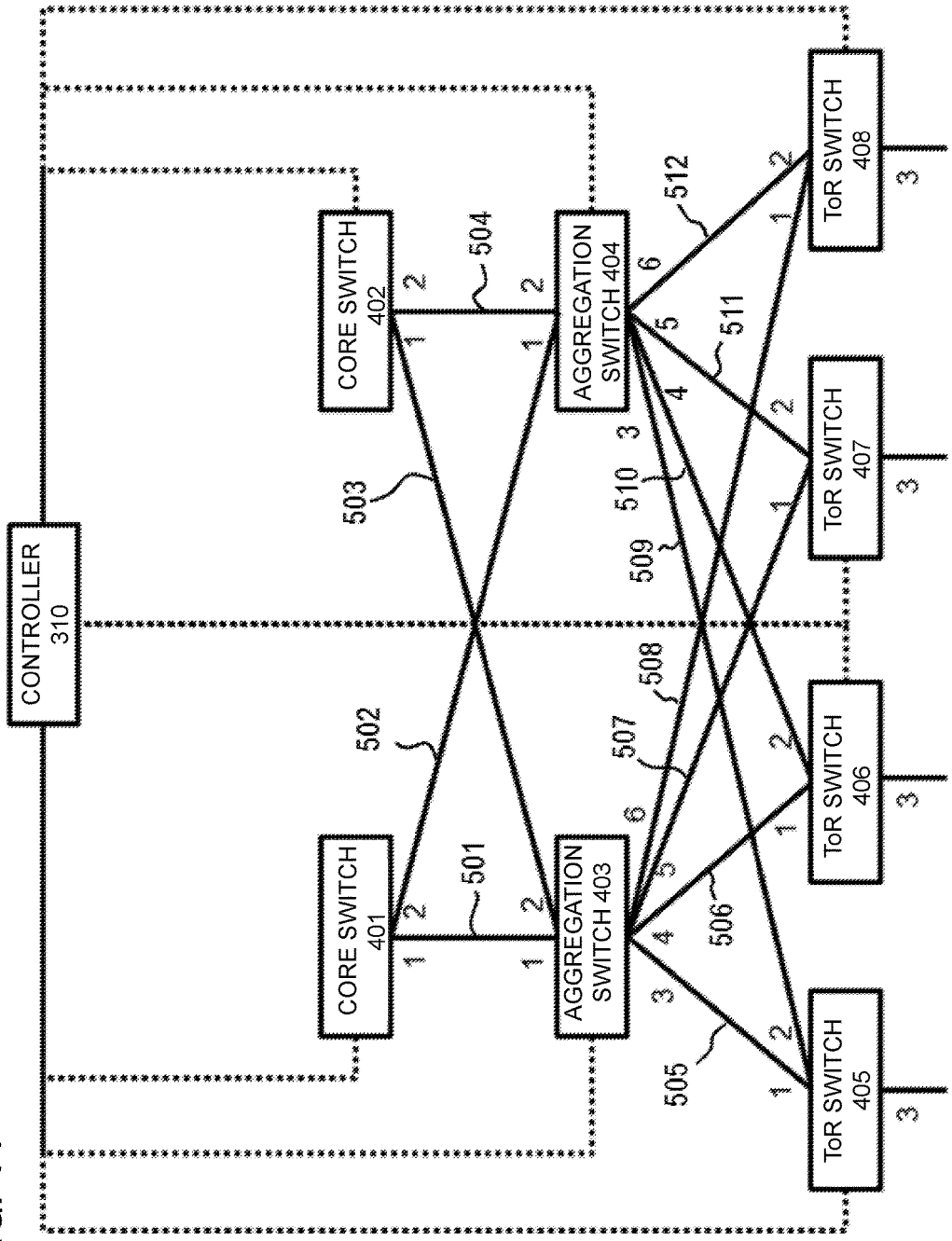
FIG. 11 illustrates an example of a configuration of a network system according to a second exemplary embodiment.

FIG. 11 illustrates an example of a configuration of the network system according to the present exemplary embodiment. As illustrated in FIG. 11, the network system according to the present exemplary embodiment includes, a network including core switches 401 and 402, a network including aggregation switches 403 and 404, a network including ToR switches 405 to 408, and a controller 310 managing and controlling these networks.

In FIG. 11, solid lines indicate links between switches, and numbers added at both ends of each of the links represent port numbers of the corresponding switches. In addition, in FIG. 11, dotted lines indicate network lines via which the controller 310 is connected to the switches.

Figure 12:
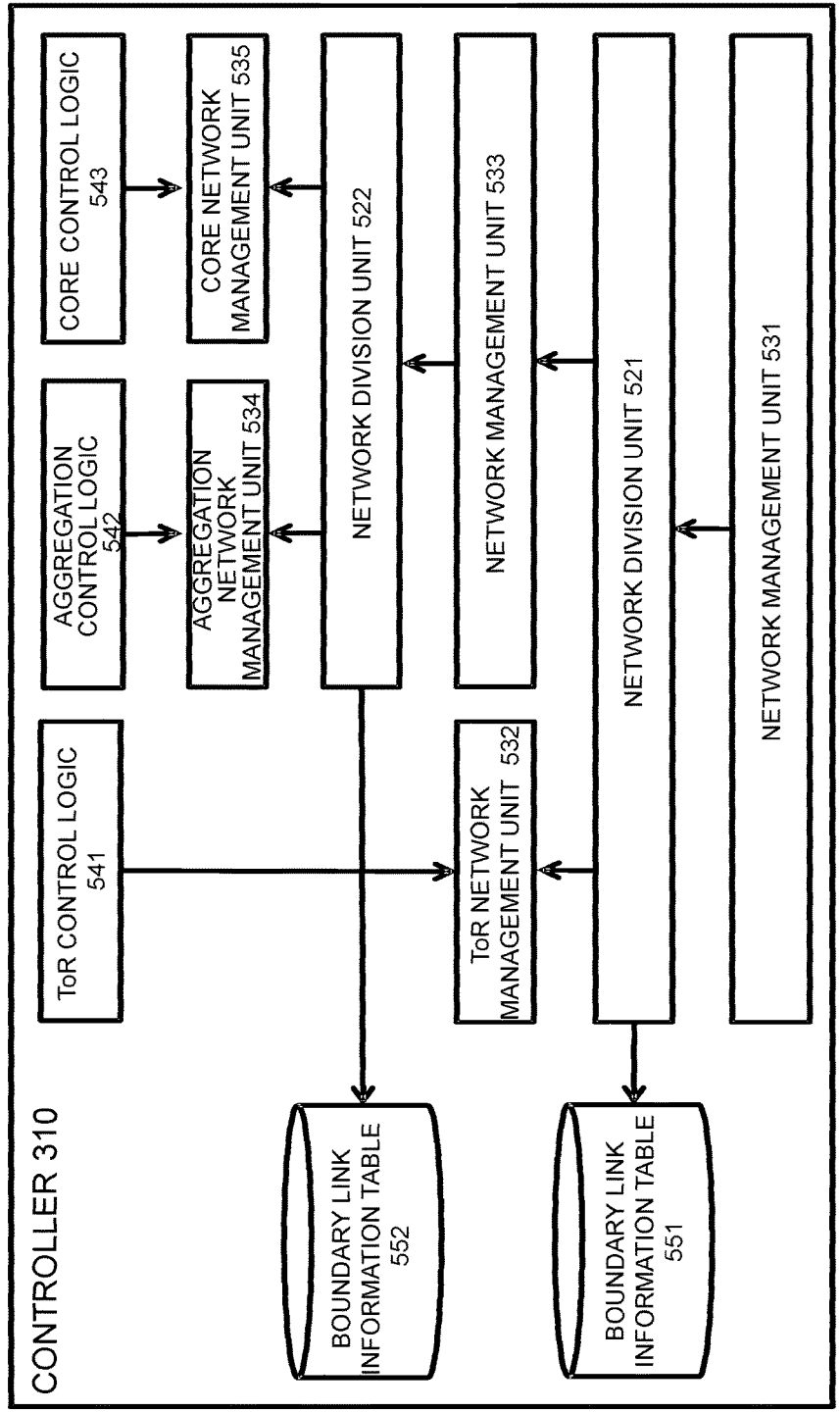
FIG. 12 is a block diagram illustrating an example of a configuration of a controller used in the network system according to the second exemplary embodiment.

FIG. 12 is a block diagram illustrating an example of a configuration of the controller 310. As illustrated in FIG. 12, the controller 310 includes a network management unit 531, a network division unit 521, a ToR network management unit 532, a network management unit 533, a network division unit 522, an aggregation network management unit 534, a core network management unit 535, a ToR control logic 541, an aggregation control logic 542, a core control logic 543, and boundary link information tables 551 and 552.

The network management unit 531 manages network information about the switches 401 to 408. In the network managed by the network management unit 531, the network division unit 521 registers the switches 405 to 408 in the ToR network management unit 532 as switches included in the edge network. In addition, the network division unit 521 registers the switches 401 to 404 in the network management unit 533 as switches included in the core network. In addition, based on the network management unit 531, the network division unit 521 registers the links between the edge network and the core network in the boundary link information table 551 as boundary link information.

In the network managed by the network management unit 533, the network division unit 522 registers the switches 403 and 404 in the aggregation network management unit 534 as switches included in the edge network. In addition, the network division unit 522 registers the switches 401 and 402 in the network management unit 535 as switches included in the core network. In addition, based on the network management unit 533, the network division unit 522 registers the links between the edge network and the core network in the boundary link information table 552 as boundary link information.

The ToR control logic 541 controls the network information in the ToR network management unit 532. The aggregation control logic 542 controls the network information in the aggregation network management unit 534. The core control logic 543 controls the network information in the core network management unit 535.

FIG. 13 illustrates the network information held in the network management unit 531. This network information includes a list of node and port information, a list of link information, and a list of flow information.

FIG. 14 illustrates the network information managed by the ToR network management unit 532, namely, the network information about switches that the network division unit 521 has determined to be the edges based on the network information stored in the network management unit 531.

FIG. 15 illustrates the network information managed by the network management unit 533, namely, the network information about switches that the network division unit 521 has determined to be the cores based on the network information stored in the network management unit 531.

FIG. 16 illustrates the boundary link information managed by the boundary link information table 551, namely, the information about the links that serve as the boundary links when the network division unit 521 divides the network managed by the network management unit 531 into the network managed by the ToR network management unit 532 and the network managed by the network management unit 533.

FIG. 17 illustrates the network information managed by the aggregation network management unit 534, namely, the network information about switches that the network division unit 522 determines to be the edges based on the network information stored in the network management unit 533.

FIG. 18 illustrates the network information managed by the core network management unit 535, namely, the network information about switches that the network division unit 522 determines to be the cores based on the network information stored in the network management unit 533.

FIG. 19 illustrates the boundary link information managed by the boundary link information table 552, namely, the information about the links that serve as the boundary links when the network division unit 522 divides the network managed by the network management unit 533 into the network managed by the aggregation network management unit 534 and the network managed by the core network management unit 535.

FIGS. 20 to 24 illustrate exemplary statuses obtained after the ToR control logic 541, the aggregation control logic 542, and the core control logic 543 have registered respective flow information.

As illustrated in FIG. 24, the core control logic 543 registers flows 1 and 2 that pass through the core switch 401 in the core network management unit 535. The core control logic 543 registers a flow(s) for forwarding data to which a label indicating a destination node ID is attached (in this example, it is assumed that the switch 401 corresponds to a label L1).

As illustrated in FIG. 23, when the flows 1 and 2 are registered in the core network management unit 535 (FIG. 24), the network division unit 522 registers link information link 1 that corresponds to the added flows in the aggregation network management unit 534.

In addition, as illustrated in FIG. 23, the aggregation control logic 542 registers flows 3 and 4 in the aggregation network management unit 534. The registered flows pass through the link 1 registered above. The aggregation control logic 542 registers a flow(s) for forwarding data to which a label indicating a destination node ID is attached (in this example, it is assumed that the switches 403 and 404 correspond to labels L3 and L4, respectively).

FIG. 22 illustrates network information registered by the network division unit 522 in the network management unit 533, the information obtained by the network division unit 522 through conversion of the flow information registered in the aggregation network management unit 534 (FIG. 23) and the core network management unit (FIG. 24). Both of the flows 3 and 4 registered in the network management unit 533 pass through boundary links 501 and 502 registered in the boundary link information table 552 (FIG. 19). Therefore, the network division unit 522 divides the flow 3 into flows 31 and 32, divides the flow 4 into flows 41 and 42, and registers the divided flows in the network management unit 533. More specifically, the network division unit 522 adds an action for attaching a label, which is requested by the flow information flows 1 and 2 registered in the core network management unit 535, to each of the flows 31 and 41. In addition, the network division unit 522 adds an action for deleting the attached label to each of the flows 32 and 42.

In addition, FIG. 21 illustrates the status obtained after the ToR control logic 541 has added flow information to the ToR network management unit 532. In FIG. 21, a link 2 is link information that the network division unit 521 has generated from the flow information added to the network management unit 533. In FIG. 21, flows 5 and 6 that use this link 2 are registered as the flow information.

In addition, FIG. 20 illustrates network information registered by the network division unit 521 in the network management unit 531, the information obtained by the network division unit 521 through conversion of the flow information registered in the ToR network management unit 532 (FIG. 21) and the network management unit (FIG. 22). Both of the flows 5 and 6 registered in the network management unit 531 pass through boundary links 505 and 511 registered in the boundary link information table 551 (FIG. 16). Therefore, the network division unit 521 divides the flow 5 into flows 51 and 52, divides the flow 6 into flows 61 and 62, and registers the divided flows in the network management unit 531. More specifically, the network division unit 521 adds an action for attaching a label, which is requested by the flows 31, 32, 41 and 42 registered in the flow information registered in the network management unit 533, to each of the flows 51 and 61. In addition, the network division unit 521 adds an action for deleting the attached label to each of the flows 52 and 62.

In the network system according to the present exemplary embodiment, the network division units 521 and 522 are applied to the network management unit 531. In this way, the network can recursively be divided into two networks of the edge network and the core network. Namely, the source network including the ToR switches, the aggregation switches, and the core switches can be divided into a network including the ToR switches and a network including the aggregation switches and the core switches. In addition, the latter network can be further divided into a network including the aggregation switches and a network including the core switches.

In the above first and second exemplary embodiments, an edge switch(es) attaches a destination node ID(s) in the core network to forwarded data as a label(s). However, alternatively, the core network may acquire a destination node ID(s) in the core network from a destination node ID(s) in the edge network by using the boundary link information table and attach the acquired ID(s) as a label(s).

In addition, for example, the network control apparatus, the network system, the network control method, and the program according to the present invention are applicable to a network controller that manages and controls a network separately as an edge network and a core network, a program for managing and controlling a network, and the like.

According to the present invention, the following modes are possible.

(Mode 1)
See the network control apparatus according to the above first aspect.

(Mode 2)
The network control apparatus according to mode 1, comprising:
a boundary link information table that holds information representing a link(s) connecting an edge switch(es) and a core switch(es) that are obtained by the division performed by the network division unit.

(Mode 3)
The network control apparatus according to mode 2, wherein
when a communication flow(s) in the core network is received, the core control logic generates flow information that corresponds to the received communication flow(s) in the core network based on the topology information about the core network and the boundary link information table, and stores the flow information in the core network management unit.

(Mode 4)
The network control apparatus according to mode 3, wherein
when flow information held in the core network management unit is updated, the network division unit stores the updated flow information in the network management unit, acquires an input port included in a match condition in the updated flow information, an output port included in an action, and two ports that serve as end points of the edge network in a communication flow corresponding to the updated flow information from the boundary link information table, and stores information representing a link connecting the acquired two ports in the edge network management unit as link information.

(Mode 5)
The network control apparatus according to any one of modes 2 to 4, wherein
the edge control logic, upon reception of a communication flow(s) in the edge network, generates flow information that corresponds to the received communication flow(s) in the edge network based on the topology information about the edge network and the boundary link information table, and stores the flow information in the edge network management unit.

(Mode 6)
The network control apparatus according to mode 5, wherein
when flow information held in the edge network management unit is updated, if a communication flow corresponding to the updated flow information passes through a link represented by the link information, the network division unit divides the communication flow at both ends of the link and stores flow information that corresponds to the divided communication flows in the network management unit.

(Mode 7)
The network control apparatus according to any one of modes 2 to 6, wherein
among the plurality of switches, if a switch has at least two ports connected to other switches via links, respectively, and has a port(s) connected to a node(s) other than the plurality of switches via a link(s), the network division unit divides the switch into a logical edge switch and a logical core switch that are connected to each other via a logical link, stores the logical edge switch and the logical core switch in the edge network management unit and the core network management unit, respectively, and stores the logical link in the boundary link information table.

(Mode 8)
The network control apparatus according to any one of modes 1 to 7, wherein
the network division unit classifies an individual one of the plurality of switches into a core switch or an edge switch based on the number of ports connected to other switches via links.

(Mode 9)
The network control apparatus according to mode 8, wherein
among the plurality of switches, if a switch has at least two ports connected to other switches via links, respectively, and does not have a port(s) connected to a node(s) other than said other switches via a link(s), the network division unit determines the switch to be a core switch, and if a switch has no or one port connected to another switch via a link and has a port(s) connected to a node(s) other than said another switch via a link(s), the network division unit determines the switch to be an edge switch.

(Mode 10)
See the network system according to the above second aspect.

(Mode 11)
See the network control method according to the above third aspect.

(Mode 12)
The network control method according to mode 11, comprising:
by the computer, storing information representing a link(s) connecting an edge switch(es) and a core switch(es) that are obtained by the division in a boundary link information table.

(Mode 13)
The network control method according to mode 12, comprising:
by the computer, receiving a communication flow(s) in the core network; and
generating flow information that corresponds to the received communication flow(s) in the core network based on the topology information about the core network and the boundary link information table and storing the flow information in the core network management unit.

(Mode 14)
The network control method according to mode 13, comprising:
by the computer, storing, when flow information held in the core network management unit is updated, the updated flow information in the network management unit, acquiring an input port included in a match condition in the updated flow information, an output port included in an action, and two ports that serve as end points of the edge network in a communication flow corresponding to the updated flow information from the boundary link information table, and storing information representing a link connecting the acquired two ports in the edge network management unit as link information.

(Mode 15)
The network control method according to any one of modes 12 to 14, comprising:
by the computer, receiving a communication flow(s) in the edge network; and generating flow information that corresponds to the received communication flow(s) in the edge network based on the topology information about the edge network and the boundary link information table and storing the flow information in the edge network management unit.
(Mode 16)
The network control method according to mode 15, comprising:
by the computer, dividing, when flow information held in the edge network management unit is updated, if a communication flow corresponding to the updated flow information passes through a link represented by the link information, the communication flow at both ends of the link and storing flow information that corresponds to the divided communication flows in the network management unit.
(Mode 17)
The network control method according to any one of modes 12 to 16, comprising:
by the computer, dividing a switch among the plurality of switches that has at least two ports connected to other switches via links, respectively, and has a port(s) connected to a node(s) other than the plurality of switches via a link(s) into a logical edge switch and a logical core switch that are connected to each other via a logical link, storing the logical edge switch and the logical core switch in the edge network management unit and the core network management unit, respectively, and storing the logical link in the boundary link information table.
(Mode 18)
See the program according to the above fourth aspect.
(Mode 19)
The program according to mode 18, causing the computer to execute:
storing information representing a link(s) connecting an edge switch(es) and a core switch(es) that are obtained by the division in a boundary link information table.
(Mode 20)
The program according to mode 19, causing the computer to execute:
receiving a communication flow(s) in the core network; and generating flow information that corresponds to the received communication flow(s) in the core network based on the topology information about the core network and the boundary link information table and storing the flow information in the core network management unit.
(Mode 21)
The program according to mode 20, causing the computer to execute:
storing, when flow information held in the core network management unit is updated, the updated flow information in the network management unit, acquiring an input port included in a match condition in the updated flow information, an output port included in an action, and two ports that serve as end points of the edge network in a communication flow corresponding to the updated flow information from the boundary link information table, and storing information representing a link connecting the acquired two ports in the edge network management unit as link information.
(Mode 22)
The program according to any one of modes 19 to 21, causing the computer to execute:
receiving a communication flow(s) in the edge network; and generating flow information that corresponds to the received communication flow(s) in the edge network based on the topology information about the edge network and the boundary link information table and storing the flow information in the edge network management unit.
(Mode 23)
The program according to mode 22, causing the computer to execute:
dividing, when flow information held in the edge network management unit is updated, if a communication flow corresponding to the updated flow information passes through a link represented by the link information, the communication flow at both ends of the link and storing flow information that corresponds to the divided communication flows in the network management unit.
(Mode 24)
The program according to any one of modes 19 to 23, causing the computer to execute:
dividing a switch among the plurality of switches that has at least two ports connected to other switches via links, respectively, and has a port(s) connected to a node(s) other than the plurality of switches via a link(s) into a logical edge switch and a logical core switch that are connected to each other via a logical link, storing the logical edge switch and the logical core switch in the edge network management unit and the core network management unit, respectively, and storing the logical link in the boundary link information table.

The disclosure of each of the above PTL and NPL is incorporated herein by reference thereto. Modifications and adjustments of the exemplary embodiments are possible within the scope of the overall disclosure (including the claims) of the present invention and based on the basic technical concept of the present invention. In addition, various combinations and selections of various disclosed elements (including the elements in each of the claims, exemplary embodiments, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

10 controller
21 network division unit
31 network management unit
32 edge network management unit
33 core network management unit
41 edge control logic
42 core control logic
51 boundary link information table
61, 62 link
101 to 103, 601 to 605, 603a, 603b switch
201, 202, 701 to 703 terminal
310 controller
401, 402 core switch
403, 404 aggregation switch
405 to 408 ToR switch
501 to 512 link
521, 522 network division unit
531, 533 network management unit
532 ToR network management unit
534 aggregation network management unit
535 core network management unit
541 ToR control logic
542 aggregation control logic
543 core control logic
551, 552 boundary link information table

What is claimed is:

1. A network control apparatus, comprising:
a memory storing instructions; and
at least one processor configured to process the instructions to implement:
  a network management unit configured to hold topology information and flow information about a network including a plurality of switches;
  a network division unit configured to divide the plurality of switches into a core switch(es) and an edge switch(es) based on the topology information;
  a core network management unit configured to hold topology information and flow information about a core network including the core switch(es);
  an edge network management unit configured to hold topology information and flow information about an edge network including the edge switch(es);
  a core control logic configured to generate flow information about the core network based on the topology information about the core network and store the flow information in the core network management unit; and
  an edge control logic configured to generate flow information about the edge network based on the topology information about the edge network and store the flow information in the edge network management unit, wherein
when the core control logic is further configured to generate the flow information about the core network or when the edge control logic generates the flow information about the edge network, the network division unit is further configured to update flow information held in the network management unit.

2. The network control apparatus according to claim 1, comprising:
a boundary link information table that holds information about a link(s) connecting an edge switch(es) and a core switch(es) that are obtained by the division performed by the network division unit.

3. The network control apparatus according to claim 2, wherein
when a communication flow(s) in the core network is received, the core control logic is further configured to generate flow information that corresponds to the received communication flow(s) in the core network based on the topology information about the core network and the boundary link information table, and store the flow information in the core network management unit.

4. The network control apparatus according to claim 3, wherein
when flow information held in the core network management unit is updated, the network division unit is further configured to store the updated flow information in the network management unit, acquire an input port included in a match condition in the updated flow information, an output port included in an action, and two ports that serve as end points of the edge network in a second communication flow corresponding to the updated flow information from the boundary link information table, and store information about a link connecting the acquired two ports in the edge network management unit as link information.

5. The network control apparatus according to claim 4, wherein
the edge control logic is further configured to, upon reception of a second communication flow(s) in the edge network, generate flow information that corresponds to a registered communication flow(s) in the edge network based on the topology information about the edge network and the boundary link information table, and store the flow information in the edge network management unit.

6. The network control apparatus according to claim 4, wherein
among the plurality of switches, if a switch has at least two ports connected to other switches via links, respectively, and has a port(s) connected to a node(s) other than the plurality of switches via a link(s), the network division unit is further configured to divide the switch into a logical edge switch and a logical core switch that are connected to each other via a logical link, store the logical edge switch and the logical core switch in the edge network management unit and the core network management unit, respectively, and store the logical link in the boundary link information table.

7. The network control apparatus according to claim 3, wherein
the edge control logic is further configured to, upon reception of a second communication flow(s) in the edge network, generate flow information that corresponds to a registered communication flow(s) in the edge network based on the topology information about the edge network and the boundary link information table, and store the flow information in the edge network management unit.

8. The network control apparatus according to claim 3, wherein
among the plurality of switches, if a switch has at least two ports connected to other switches via links, respectively, and has a port(s) connected to a node(s) other than the plurality of switches via a link(s), the network division unit is further configured to divide the switch into a logical edge switch and a logical core switch that are connected to each other via a logical link, store the logical edge switch and the logical core switch in the edge network management unit and the core network management unit, respectively, and store the logical link in the boundary link information table.

9. The network control apparatus according to claim 2, wherein
the edge control logic is further configured to, upon reception of a communication flow(s) in the edge network, generate flow information that corresponds to a registered communication flow(s) in the edge network based on the topology information about the edge network and the boundary link information table, and store the flow information in the edge network management unit.

10. The network control apparatus according to claim 9, wherein
when flow information held in the edge network management unit is updated, if a second communication flow corresponding to the updated flow information passes through a link represented by the link information, the network division unit is further configured to divide the communication flow at both ends of the link and store flow information that corresponds to the divided communication flows in the network management unit.

11. The network control apparatus according to claim 10, wherein
among the plurality of switches, if a switch has at least two ports connected to other switches via links, respectively, and has a port(s) connected to a node(s) other than the plurality of switches via a link(s), the network division unit is further configured to divide the switch into a logical edge switch and a logical core switch that are connected to each other via a logical link, store the logical edge switch and the logical core switch in the edge network management unit and the core network management unit, respectively, and store the logical link in the boundary link information table.

12. The network control apparatus according to claim 9, wherein
among the plurality of switches, if a switch has at least two ports connected to other switches via links, respectively, and has a port(s) connected to a node(s) other than the plurality of switches via a link(s), the network division unit is further configured to divide the switch into a logical edge switch and a logical core switch that are connected to each other via a logical link, store the logical edge switch and the logical core switch in the edge network management unit and the core network management unit, respectively, and store the logical link in the boundary link information table.

13. The network control apparatus according to claim 2, wherein
among the plurality of switches, if a switch has at least two ports connected to other switches via links, respectively, and has a port(s) connected to a node(s) other than the plurality of switches via a link(s), the network division unit is further configured to divide the switch into a logical edge switch and a logical core switch that are connected to each other via a logical link, store the logical edge switch and the logical core switch in the edge network management unit and the core network management unit, respectively, and store the logical link in the boundary link information table.

14. A network system, comprising:
a plurality of switches; and
the network control apparatus according to claim 1.

15. A network control method, comprising:
by a computer, storing topology information and flow information about a network including a plurality of switches in a network management unit;
dividing the plurality of switches into a core switch(es) and an edge switch(es) based on the topology information;
storing topology information and flow information about a core network including the core switch(es) in a core network management unit;
storing topology information and flow information about an edge network including the edge switch(es) in an edge network management unit;
generating flow information about the core network based on the topology information about the core network and storing the flow information in the core network management unit;
generating flow information about the edge network based on the topology information about the edge network and storing the flow information in the edge network management unit; and
updating, when the flow information about the core network is generated or when the flow information about the edge network is generated, flow information held in the network management unit.

16. A non-transitory computer-readable recording medium storing a program that causes a computer to execute:
storing topology information and flow information about a network including a plurality of switches in a network management unit;
dividing the plurality of switches into a core switch(es) and an edge switch(es) based on the topology information;
storing topology information and flow information about a core network including the core switch(es) in a core network management unit;
storing topology information and flow information about an edge network including the edge switch(es) in an edge network management unit;
generating flow information about the core network based on the topology information about the core network and storing the flow information in the core network management unit;
generating flow information about the edge network based on the topology information about the edge network and storing the flow information in the edge network management unit; and
updating, when the flow information about the core network is generated or when the flow information about the edge network is generated, flow information held in the network management unit.

* * * * *